US012587356B2

(12) United States Patent
Park

(10) Patent No.: US 12,587,356 B2
(45) Date of Patent: Mar. 24, 2026

(54) ACCELERATOR DEVICE AND OPERATING METHOD OF ACCELERATOR DEVICE

(71) Applicant: Electronics and Telecommunications Research Institute, Daejeon (KR)

(72) Inventor: Seong-Cheon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 287 days.

(21) Appl. No.: 18/351,163

(22) Filed: Jul. 12, 2023

(65) Prior Publication Data

US 2024/0022393 A1    Jan. 18, 2024

(30) Foreign Application Priority Data

Jul. 12, 2022    (KR) ........................ 10-2022-0085414
Jun. 23, 2023    (KR) ........................ 10-2023-0081050

(51) Int. Cl.
*H04L 9/00*        (2022.01)
*H04L 9/30*        (2006.01)

(52) U.S. Cl.
CPC .................................. *H04L 9/008* (2013.01)

(58) Field of Classification Search
CPC .. H04L 9/008; H04L 9/3093; H04L 2209/125
See application file for complete search history.

(56) References Cited

U.S. PATENT DOCUMENTS

| 7,581,155 B2 | 8/2009 | Lee et al. |
| 10,298,385 B2 | 5/2019 | Khedr et al. |
| 11,206,136 B1 | 12/2021 | Renes et al. |
| 11,895,224 B2 | 2/2024 | Shin et al. |
| 2022/0200628 A1 | 6/2022 | Park et al. |

(Continued)

FOREIGN PATENT DOCUMENTS

| EP | 4195578 A1 | 6/2023 |
| JP | 7069460 B2 | 5/2022 |

(Continued)

OTHER PUBLICATIONS

Changmin Lee et al, Faster TFHE Bootstrapping with Block Binary Keys, Jul. 11, 2023 Republic of Korea.

(Continued)

*Primary Examiner* — Vu V Tran
(74) *Attorney, Agent, or Firm* — WILLIAM PARK AND ASSOCIATES LTD.

(57) ABSTRACT

Disclosed is an accelerator device, which includes a first NTT converter that performs an NTT operation on a first ciphertext of a first type to generate a first internal signal, a test polynomial generator that generates a test polynomial, a second NTT converter that performs the NTT operation on the test polynomial to generate a second internal signal, a first multiplier that performs a multiplication on the first internal signal and the second internal signal to generate a third internal signal, a first INTT converter that performs an INTT operation on the third internal signal to generate a fourth internal signal, a gadget decomposer that performs a gadget decomposition on the fourth internal signal to generate a fifth internal signal, and a third NTT converter that performs the NTT operation on the fifth internal signal to generate a sixth internal signal.

19 Claims, 10 Drawing Sheets

(56)         References Cited

U.S. PATENT DOCUMENTS

| | | | |
|---|---|---|---|
| 2023/0385061 A1* | 11/2023 | Ren | H04L 9/008 |
| 2024/0305445 A1* | 9/2024 | Hoshizuki | G06F 7/535 |
| 2025/0036714 A1* | 1/2025 | Joye | H04L 9/008 |

FOREIGN PATENT DOCUMENTS

| | | |
|---|---|---|
| KR | 101952547 B1 | 2/2019 |
| KR | 1020190138815 A | 12/2019 |
| KR | 102203238 B1 | 1/2021 |
| KR | 1020210067961 A | 6/2021 |
| KR | 1020220078155 A | 6/2022 |

OTHER PUBLICATIONS

Hyunwoo Kim et al., Efficient Hardware Acceleration of Chinese Remainder Theorem for Fully Homomorphic Encryption, 2023 International Conference on Electronics, Information, and Communication (ICEIC), Feb. 5-Feb. 8, 2023, Shangri-La, Singapore.
Ilaria Chillotti, et al., TFHE: Fast Fully Homomorphic Encryption over the Torus, EPO Jul. 11, 2018, France.
Kamil Kluczniak et al., FDFB: Full Domain Functional Bootstrapping Towards Practical Fully Homomorphic Encryption, Jan. 4, 2023 Saarbruken, Germany.
Michiel Van Beirendonck et al., FTP a Fixed-Point Accelerator for Torus Fully Homomorphic Encryption, Dec. 19, 2022 Leuven, Belgium.

\* cited by examiner

FIG. 2

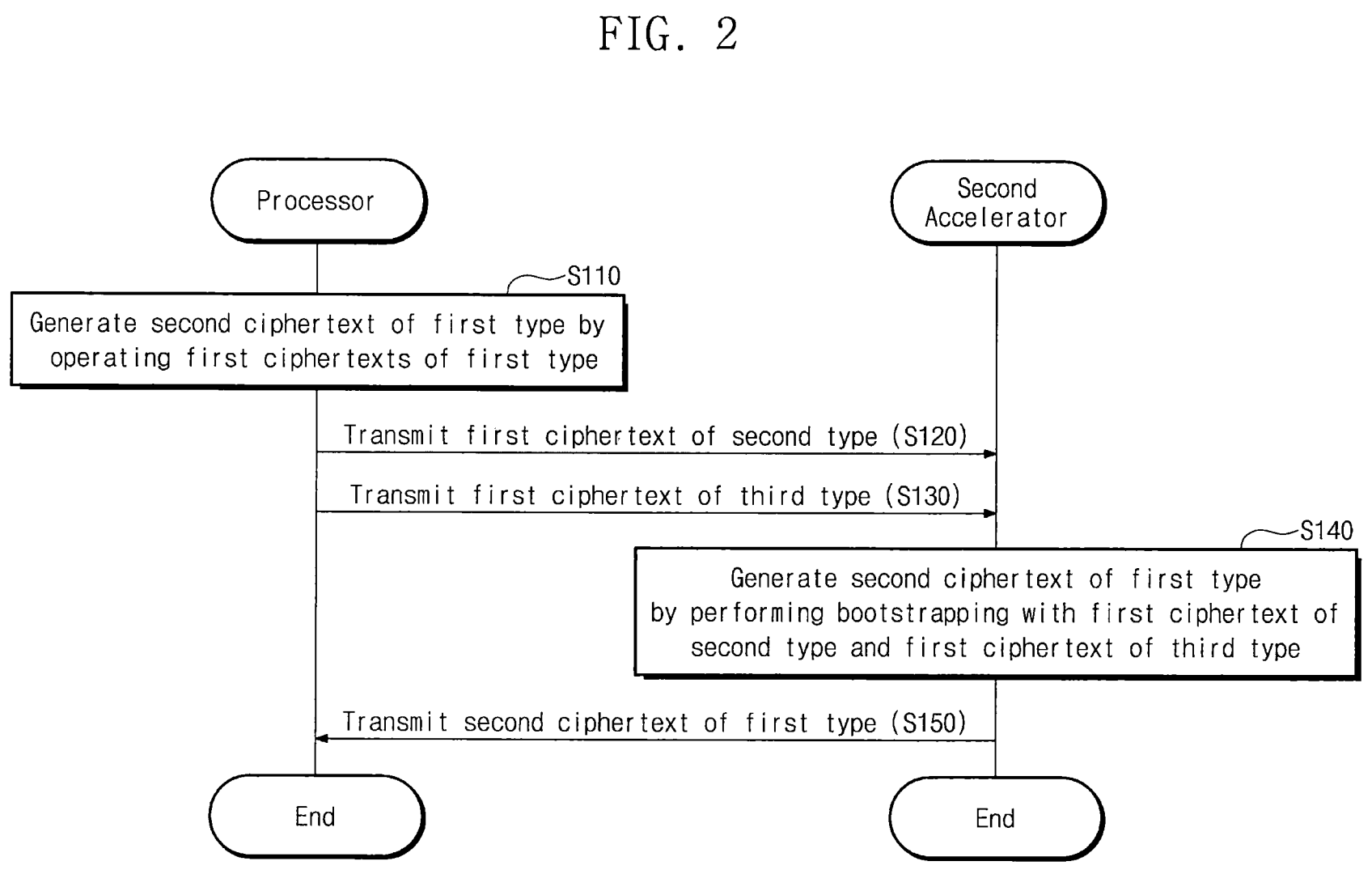

Processor

S110

Generate second ciphertext of first type by operating first ciphertexts of first type Second Accelerator Transmit first ciphertext of second type (S120)

Transmit first ciphertext of third type (S130)

S140

Generate second ciphertext of first type by performing bootstrapping with first ciphertext of second type and first ciphertext of third type Transmit second ciphertext of first type (S150)

End

End

| $A_0(x)$ | $B_0(x)$ |
|----------|----------|
| $A_1(x)$ | $B_1(x)$ |
| $A_2(x)$ | $B_2(x)$ |
| $A_3(x)$ | $B_3(x)$ |
| $A_4(x)$ | $B_4(x)$ |
| $A_5(x)$ | $B_5(x)$ |

| $a_0(x)$ | $a_1(x)$ | $a_2(x)$ | $b_0(x)$ | $b_1(x)$ | $b_2(x)$ |
|----------|----------|----------|----------|----------|----------|

Figures 7, 8:
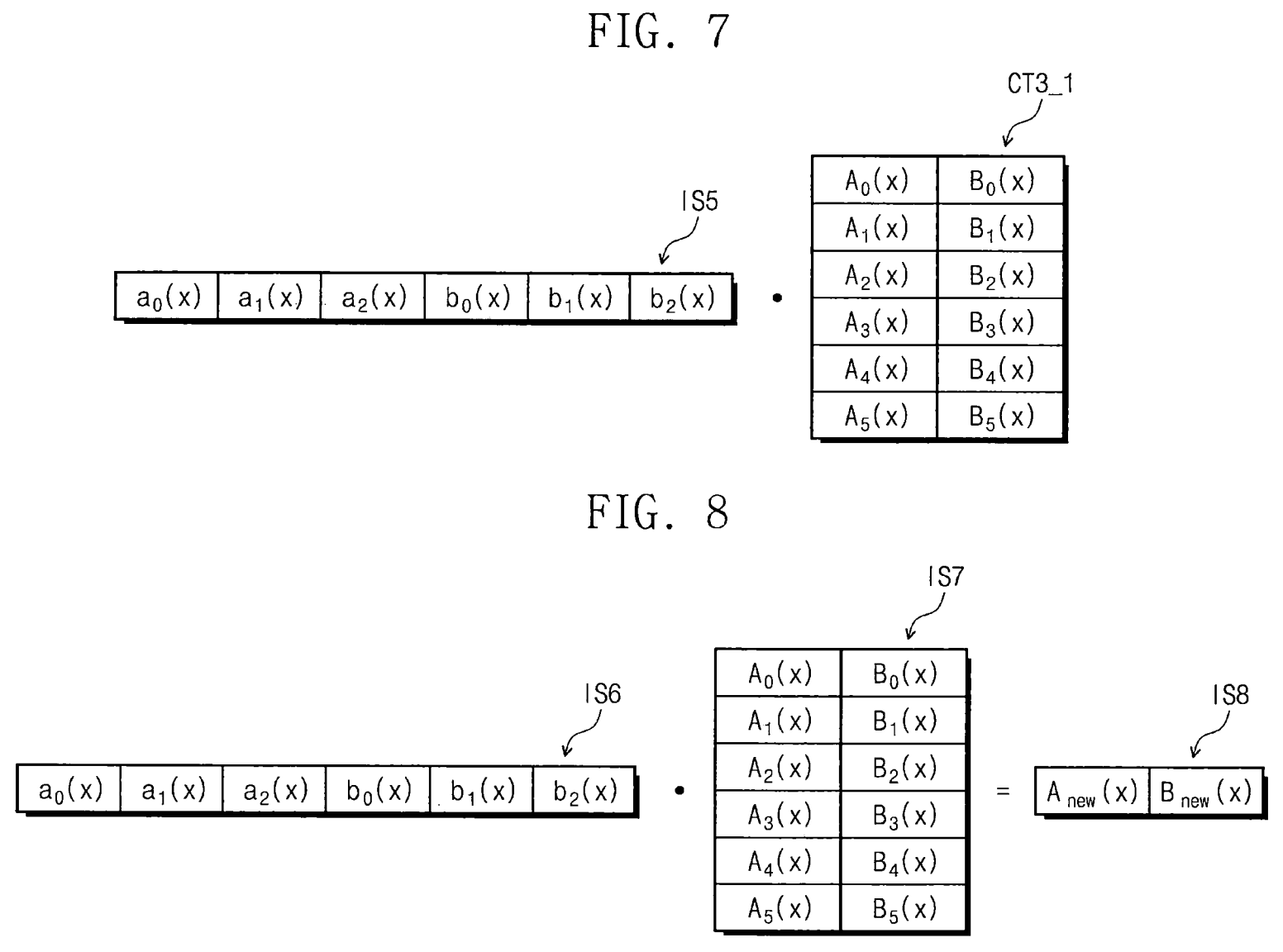

| $A_0(x)$ | $B_0(x)$ |
|----------|----------|
| $A_1(x)$ | $B_1(x)$ |
| $A_2(x)$ | $B_2(x)$ |
| $A_3(x)$ | $B_3(x)$ |
| $A_4(x)$ | $B_4(x)$ |
| $A_5(x)$ | $B_5(x)$ |

$\cdot$

IS5

| $a_0(x)$ | $a_1(x)$ | $a_2(x)$ | $b_0(x)$ | $b_1(x)$ | $b_2(x)$ |
|----------|----------|----------|----------|----------|----------|

| $A_{new}(x)$ | $B_{new}(x)$ |
|--------------|--------------|

$=$

IS7

| $A_0(x)$ | $B_0(x)$ |
|----------|----------|
| $A_1(x)$ | $B_1(x)$ |
| $A_2(x)$ | $B_2(x)$ |
| $A_3(x)$ | $B_3(x)$ |
| $A_4(x)$ | $B_4(x)$ |
| $A_5(x)$ | $B_5(x)$ |

$\cdot$

IS6

| $a_0(x)$ | $a_1(x)$ | $a_2(x)$ | $b_0(x)$ | $b_1(x)$ | $b_2(x)$ |
|----------|----------|----------|----------|----------|----------|

Figure 10:
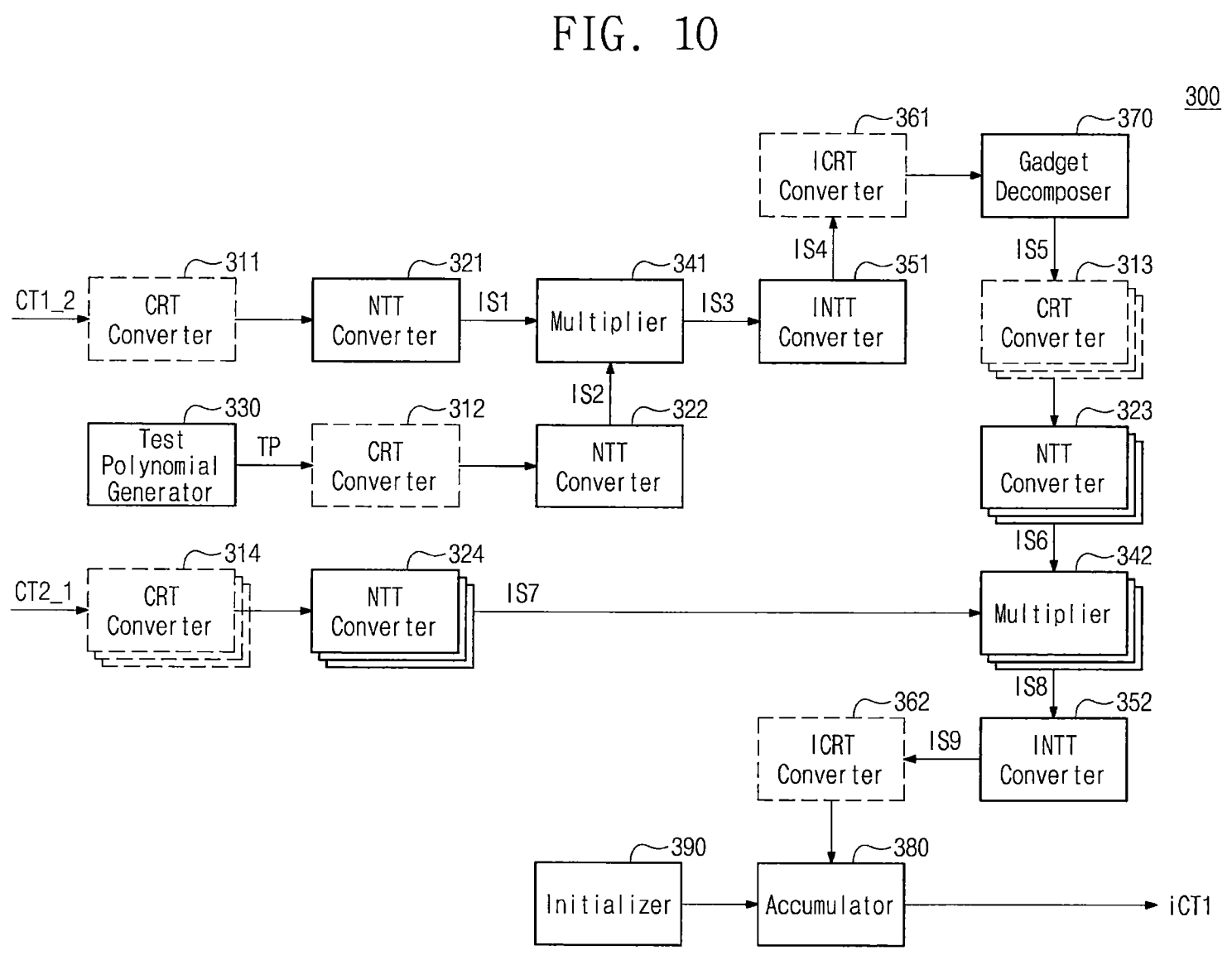

CT1_2 → CRT Converter (311) → NTT Converter (321) → IS1 → Multiplier (341) → IS3 → INTT Converter (351) → IS4 → ICRT Converter (361) → Gadget Decomposer (370) → IS5 → CRT Converter (313) → NTT Converter (323) → IS6 → Multiplier (342) → IS8 → INTT Converter (352)

Test Polynomial Generator (330) → TP → CRT Converter (312) → NTT Converter (322) → IS2 → Multiplier (341)

CT2_1 → CRT Converter (314) → NTT Converter (324) → IS7 → Multiplier (342)

INTT Converter (352) → IS9 → ICRT Converter (362) → Accumulator (380) → iCT1

Initializer (390) → Accumulator (380)

1

ACCELERATOR DEVICE AND OPERATING METHOD OF ACCELERATOR DEVICE

CROSS-REFERENCE TO RELATED APPLICATIONS

This application claims priority under 35 U.S.C. § 119(a) to Korean Patent Application Nos. 10-2022-0085414 filed on Jul. 12, 2022 and 10-2023-0081050 filed on Jun. 23, 2023, respectively, in the Korean Intellectual Property Office, the disclosures of which are incorporated by reference herein in their entireties.

BACKGROUND

Embodiments of the present disclosure described herein relate to an accelerator device, and more particularly, relate to an accelerator device for accelerating an operation of homomorphic encrypted ciphertexts and an operating method of the accelerator device.

Fully Homomorphic Encryption (FHE) may support an operation or combination between ciphertexts in an encrypted state. The Fully Homomorphic Encryption may be implemented based on various algorithms such as TFHE (Torus FHE) algorithm, BGV (Brakerski-Gentry-Vaikuntanathan) algorithm, BFV (Brakerski-Fan-Vercauteren) algorithm, CKKS (Cheon-Kim-Kim-Song) algorithm, etc.

The operation of ciphertexts performed in an encrypted state may increase noise in an operated ciphertext. To reduce noise in the operated ciphertext, bootstrapping may be performed.

SUMMARY

Embodiments of the present disclosure provide an accelerator device for accelerating the bootstrapping of an FHE (Fully Homomorphic Encryption) and an operating method of the accelerator device.

According to an embodiment of the present disclosure, an accelerator device includes a first NTT converter that performs an NTT (Number Theoretic Transform) operation on a first ciphertext of a first type received from an outside to generate a first internal signal, a test polynomial generator that generates a test polynomial, a second NTT converter that performs the NTT operation on the test polynomial to generate a second internal signal, a first multiplier that performs a multiplication on the first internal signal and the second internal signal to generate a third internal signal, a first inverse NTT (INTT) converter that performs an INTT operation on the third internal signal to generate a fourth internal signal, a gadget decomposer that performs a gadget decomposition on the fourth internal signal to generate a fifth internal signal, a third NTT converter that performs the NTT operation on the fifth internal signal to generate a sixth internal signal, a fourth NTT converter that performs the NTT operation on a first ciphertext of a second type received from the outside to generate a seventh internal signal, a second multiplier that performs the multiplication on the sixth internal signal and the seventh internal signal to generate an eighth internal signal, a second INTT converter that performs the INTT operation on the eighth internal signal to generate a ninth internal signal, and an accumulator that accumulates the ninth internal signal to generate a second ciphertext of the first type.

According to an embodiment, the first type may include a TRLWE (Torus Ring Learning With Error).

According to an embodiment, the second type may include a TRGSW (Torus Ring Gentry, Sahai, Waters).

According to an embodiment, the fifth internal signal may include a plurality of polynomials, and the third NTT converter may include a plurality of NTT modules configured to perform the NTT operation each of the plurality of polynomials.

According to an embodiment, the first ciphertext of the second type may include a plurality of polynomials, and the fourth NTT converter may include a plurality of NTT modules configured to perform the NTT operation each of the plurality of polynomials.

According to an embodiment, the sixth internal signal may include a plurality of first polynomials, the seventh internal signal may include a plurality of second polynomials, and the second multiplier may include a plurality of multiplication modules that performs multiplications of the plurality of first polynomials and the plurality of second polynomials in parallel.

According to an embodiment, the second multiplier may further include at least one addition module that adds outputs of the plurality of multiplication modules.

According to an embodiment, the accelerator device may further include a first CRT converter that performs a first Chinese Remainder Theorem (CRT) conversion on the first ciphertext of the first type, and transfers a result of the first CRT conversion to the first NTT converter.

According to an embodiment, the accelerator device may further include a second CRT converter that performs a second Chinese Remainder Theorem (CRT) conversion on the test polynomial, and transfers a result of the second CRT conversion to the second NTT converter.

According to an embodiment, the accelerator device may further include an ICRT converter that performs an inverse CRT (ICRT) conversion on the fourth internal signal, and transfers a result of the ICRT conversion to the gadget decomposer.

According to an embodiment, the accelerator device may further include a first CRT converter that performs a first Chinese Remainder Theorem (CRT) conversion on the fifth internal signal, and transfers a result of the first CRT conversion to the third NTT converter.

According to an embodiment, the accelerator device may further include a second CRT converter that performs a second CRT conversion on the first ciphertext of the second type, and transfers a result of the second CRT conversion to the fourth NTT converter.

According to an embodiment, the accelerator device may further include an ICRT converter that performs an inverse CRT (ICRT) conversion on the ninth internal signal, and transfers a result of the ICRT conversion to the accumulator.

According to an embodiment of the present disclosure, a method of operating an accelerator device includes generating, by the accelerator device, a test polynomial, performing, by the accelerator device, a first multiplication with respect to the test polynomial and a first ciphertext of a first type received from an outside, performing, by the accelerator device, gadget decomposition on a result of the first multiplication, performing, by the accelerator device, a second multiplication with respect to polynomials decomposed by the gadget decomposition and a first ciphertext of a second type received from the outside, and accumulating, by the accelerator device, a result of the second multiplication, and the accelerator device performs the second multiplication in parallel using a plurality of multiplication modules.

According to an embodiment, the method of operating an accelerator device may further include performing, by the accelerator device, first NTT operations in parallel on polynomials decomposed by the gadget decomposition using a plurality of first number theoretic transform (NTT) modules.

According to an embodiment, the method of operating an accelerator device may further include performing, by the accelerator device, second NTT operations in parallel on the first ciphertext of the second type using a plurality of second NTT modules.

According to an embodiment, the method of operating an accelerator device may further include performing, by the accelerator device, an inverse NTT (INTT) operation on the result of the second multiplication using an inverse NTT converter.

According to an embodiment, the method of operating an accelerator device may further include performing, by the accelerator device, first CRT conversions in parallel on polynomials decomposed by the gadget decomposition using a plurality of first Chinese Remainder Theorem (CRT) conversion modules.

According to an embodiment, the method of operating an accelerator device may further include performing, by the accelerator device, second CRT conversions in parallel on the first ciphertext of the second type using a plurality of second CRT conversion modules.

According to an embodiment, the method of operating an accelerator device may further include performing, by the accelerator device, an ICRT conversion on the result of the second multiplication using an inverse CRT converter.

BRIEF DESCRIPTION OF THE FIGURES

The above and other objects and features of the present disclosure will become apparent by describing in detail embodiments thereof with reference to the accompanying drawings.

FIG. 2 illustrates an operating method of a computing device according to an embodiment of the present disclosure.

FIG. 4 illustrates an example of a blind rotate module, according to an embodiment of the present disclosure.

FIG. 5 illustrates an example of a first ciphertext of a third type.

FIG. 6 illustrates an example of a fifth internal signal.

FIG. 7 illustrates an example in which a fifth internal signal is multiplied by a first ciphertext of a third type.

FIG. 8 illustrates an example in which a sixth internal signal is multiplied by a seventh internal signal.

FIG. 10 illustrates an example of a blind rotate module that performs a second multiplication in parallel.

DETAILED DESCRIPTION

Hereinafter, embodiments of the present disclosure may be described in detail and clearly to such an extent that an ordinary one in the art easily implements the present disclosure.

Figure 1:
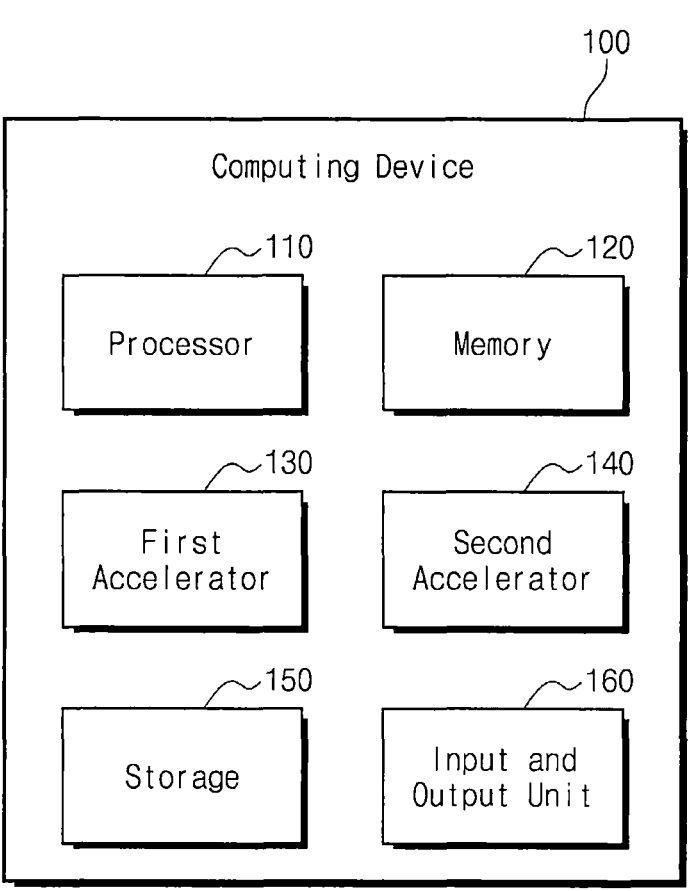
FIG. 1 illustrates a computing device according to an embodiment of the present disclosure.

FIG. 1 illustrates a computing device 100 according to an embodiment of the present disclosure. For example, the computing device 100 may be implemented in various types of devices such as a personal computer, workstation, server, smart phone, smart pad, etc. Referring to FIG. 1, the computing device 100 includes a processor 110, a memory 120, a first accelerator 130, a second accelerator 140, storage 150, and an input and output unit 160.

The processor 110 may control the computing device 100 and may execute an operating system and applications. The processor 110 may include a multi-core processor including two or more cores. The processor 110 may be implemented as a central processing unit (CPU) or an application processor (AP).

The memory 120 may be the main memory of the computing device 100. The memory 120 may include a volatile memory such as a dynamic random access memory (DRAM) or a non-volatile memory such as a phase-change RAM (PRAM), a magnetic RAM (MRAM), a ferroelectric RAM (FRAM), and resistive RAM (RRAM). The processor 110 may load operating system codes or application codes into the memory 120 and may execute the loaded codes. The processor 110 may store data generated by an operating system or applications in the memory 120.

The first accelerator 130 may support tasks of the processor 110. For example, the first accelerator 130 may receive and execute some of the tasks of the processor 110. The first accelerator 130 may include a graphics processing unit (GPU) that receives and processes tasks related to graphics, a neural processing unit (NPU) that receives and processes tasks related to machine learning, an image signal processor (ISP) that receives and processes tasks related to image signals, a digital signal processor (DSP) that receives and processes tasks related to digital signals, etc.

The second accelerator 140 may support tasks of the processor 110. For example, the first accelerator 130 may receive and execute tasks related to the Fully Homomorphic Encryption (FHE) among tasks of the processor 110. For example, the first accelerator 130 may receive and perform tasks related to bootstrapping of the Torus FHE (TFHE). The bootstrapping may include an operation of reducing noise generated from the operated ciphertexts by operating ciphertexts in a homomorphic encrypted state.

The storage 150 may store data of the computing device 100 in a non-volatile manner. The storage 150 may store original data (or installation data) of the operating system and applications. The processor 110 may read codes of the operating system or applications from the storage 150 and may load the read codes into the memory 120 to execute the codes. The storage 150 may store data generated by the operating system or applications. The processor 110 may store data generated by the operating system or applications and stored in the memory 120 into the storage 150 in a non-volatile manner. The storage 150 may include a hard disk drive (HDD) or a solid state drive (SSD) including a non-volatile memory such as a flash memory, a phase change memory, a magnetic memory, a ferroelectric memory, and a resistive memory.

The input and output unit 160 may be used to input data to computing device 100 or to allow computing device 100 to output data. The input and output unit 160 may include a user input interface or a user output interface that are configured to exchange data with a user. The input and output unit 160 may include a modem, communication port, etc. configured to exchange data with other computing devices.

The FHE may be implemented based on various algorithms such as TFHE (Torus FHE) algorithm, BGV (Brakerski-Gentry-Vaikuntanathan) algorithm, BFV (Brakerski-Fan-Vercauteren) algorithm, CKKS (Cheon-Kim-Kim-Song) algorithm, etc. The BGV algorithm, BFV algorithm, and CKKS algorithm perform integer operations, while the TFHE algorithm performs logic gate operations or Boolean operations. Therefore, the operation overhead of the TFHE algorithm may be less than that of the BGV algorithm, the BFV algorithm, and the CKKS algorithm.

However, the TFHE algorithm requires the bootstrapping to be performed whenever the ciphertexts are operated. In detail, compared to the BGV algorithm, BFV algorithm, and CKKS algorithm, the TFHE algorithm may have greater bootstrapping overhead.

The second accelerator 140 of the computing device 100 according to an embodiment of the present disclosure may be a hardware accelerator implemented to perform bootstrapping of the TFHE algorithm. When the bootstrapping operation of the TFHE algorithm is performed by the second accelerator 140, the processor 110 may perform only the logic gate operation of the TFHE algorithm without bootstrapping overhead. Accordingly, the speed at which computing device 100 performs operations of the TFHE algorithm may be improved.

FIG. 2 illustrates an operating method of the computing device 100 according to an embodiment of the present disclosure. Referring to FIGS. 1 and 2, in operation S110, the processor 110 may generate a first ciphertext of a second type by operating first ciphertexts of a first type. The first type may indicate a TLWE (Torus Learning With Error). The first ciphertexts of the first type may be TLWE ciphertexts. The second type may indicate a TRLWE (Torus Ring Learning With Error). The first ciphertext of the second type may be a TRLWE ciphertext. The TRLWE ciphertext may include polynomials each having 'n' coefficients (where 'n' is a positive integer), for example, a pair of polynomials. The operation of the first ciphertexts of the first type may be a logic gate operation.

In operation S120, the processor 110 may transmit the first ciphertext of the second type to the second accelerator 140. For example, the processor 110 may transmit the first ciphertext of the second type, which is an operation result of the first ciphertexts of the first type, to the second accelerator 140 to perform the bootstrapping.

In operation S130, the processor 110 may transmit the first ciphertext of a third type to the second accelerator 140. The third type may indicate a TRGSW (Torus Ring Gentry, Sahai, Waters). The first ciphertext of the third type may be a TRGSW ciphertext. The TRGSW ciphertext may include 2m*2 ('m' is a positive integer) polynomials each having 'n' coefficients. The first ciphertext of the third type may be a ciphertext obtained by encrypting a secret key (e.g., 's') used to encrypt the first ciphertexts of the first type. For example, the first ciphertext of the third type may be encrypted using a key (e.g., 't') different from the secret key (e.g., 's'). The first ciphertext of the third type may be used as a bootstrapping key in a bootstrapping process.

For example, the second accelerator 140 may receive the first ciphertext of the third type from another computing device through the input and output unit 160 instead of receiving the first ciphertext of the third type from the processor 110.

In operation S140, the second accelerator 140 may perform bootstrapping with the first ciphertext of the second type and the first ciphertext of the third type to generate the second ciphertext of the first type. The second ciphertext of the first type may be a TLWE ciphertext. The second ciphertext of the first type may be in a form in which TFHE operation is possible.

In operation S150, the second accelerator 140 may transmit the second ciphertext of the first type to the processor 110. For example, the second accelerator 140 may transmit the second ciphertext of the first type generated as a result of bootstrapping to the processor 110. The processor 110 may use the second ciphertext of the first type in an additional operation, may store it in the memory 120 or the storage 150, or may transmit it to a user or another computing device through the input and output unit 160.

Figure 3:
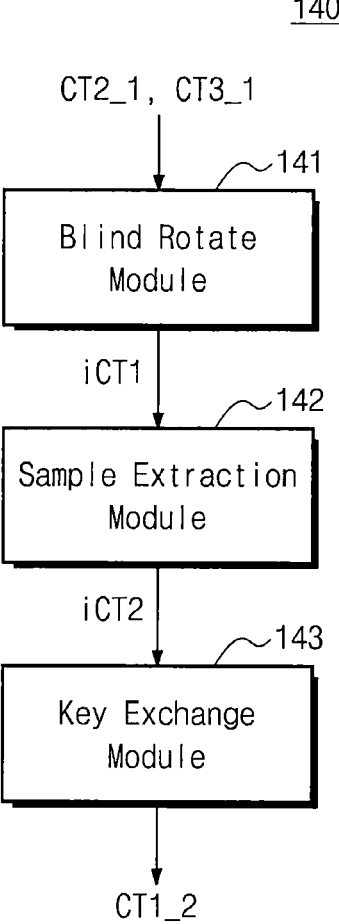
FIG. 3 illustrates an example of modules of a second accelerator.

FIG. 3 illustrates an example of modules of the second accelerator 140. Referring to FIG. 3, the second accelerator 140 may include a blind rotate module 141, a sample extraction module 142, and a key exchange module 143.

The blind rotate module 141 may receive a first ciphertext CT2_1 of the second type and a first ciphertext CT3_1 of the third type from the processor 110. The blind rotate module 141 may perform a preset operation (e.g., also known as a CMUX operation (controlled MUX gate operation)) by a preset number of times with respect to the first ciphertext CT2_1 of the second type and the first ciphertext CT3_1 of the third type. The blind rotate module 141 may output a result of the operation as a first internal ciphertext iCT1. The first internal ciphertext iCT1 may be a ciphertext of the second type, for example, the TRLWE ciphertext.

The sample extraction module 142 may receive the first internal ciphertext iCT1 from the blind rotate module 141. The sample extraction module 142 may extract a second internal ciphertext iCT2 from the first internal ciphertext iCT1. For example, the sample extraction module 142 may extract the second internal ciphertext iCT2, which is the TLWE ciphertext by extracting coefficients of TRLWE polynomials of the first internal ciphertext iCT1. However, since the first ciphertext CT3_1 of the third type is used as a bootstrapping key in the blind rotate module 141, the second internal ciphertext iCT2 may be provided to a dimension corresponding a key (e.g., 't') used to encrypt the first ciphertext CT3_1 of the third type.

The key exchange module 143 may receive the second internal ciphertext iCT2 from the sample extraction module 142. The key exchange module 143 may exchange the key (e.g., 't') of the second internal ciphertext iCT2 with a secret key (e.g., 's'). By performing key exchange, the key exchange module 143 may generate a second ciphertext CT1_2 of the first type provided to the dimension corresponding to the same secret key (e.g., 's') as the first ciphertexts of the first type. In detail, the second ciphertext CT1_2 of the first type may be the TLWE ciphertext operable with other ciphertexts of the first type in the processor 110.

For example, when the functions of the blind rotate module 141, the sample extraction module 142, and the key exchange module 143 are executed by the operation of the processor 110, the time to execute the functions of the blind rotate module 141 may be about 90% of the total operation execution time. The time to execute the functions of the key exchange module 143 may be about 10% of the total operation execution time. The time to execute the functions of the sample extraction module 142 may be insignificant compared to the total operation execution time.

The second accelerator 140 according to an embodiment of the present disclosure may be a hardware accelerator implemented to perform all functions of the blind rotate module 141, the sample extraction module 142, and the key exchange module 143. As another example, the second accelerator 140 according to an embodiment of the present disclosure may be a hardware accelerator implemented to perform functions of the blind rotate module 141 and the sample extraction module 142. Functions of the key exchange module 143 may be performed through operation of the processor 110. As another example, the second accelerator 140 according to an embodiment of the present disclosure may be a hardware accelerator implemented to perform functions of the blind rotate module 141. Functions of the sample extraction module 142 and the key exchange module 143 may be performed through operation of the processor 110.

Illustratively, the blind rotate module 141 and the sample extraction module 142 may be implemented as a bootstrapping module that performs a bootstrapping operation. The second internal ciphertext iCT2 may be referred to as a result of the bootstrapping operation.

Illustratively, the bootstrapping module including the blind rotate module 141 and the sample extraction module 142 and the key exchange module 143 may be implemented as a TFHE NAND module that performs a TFHE NAND operation. The second ciphertext CT1_2 of the first type may be referred to as a result of the TFHE NAND operation.

Figure 4:
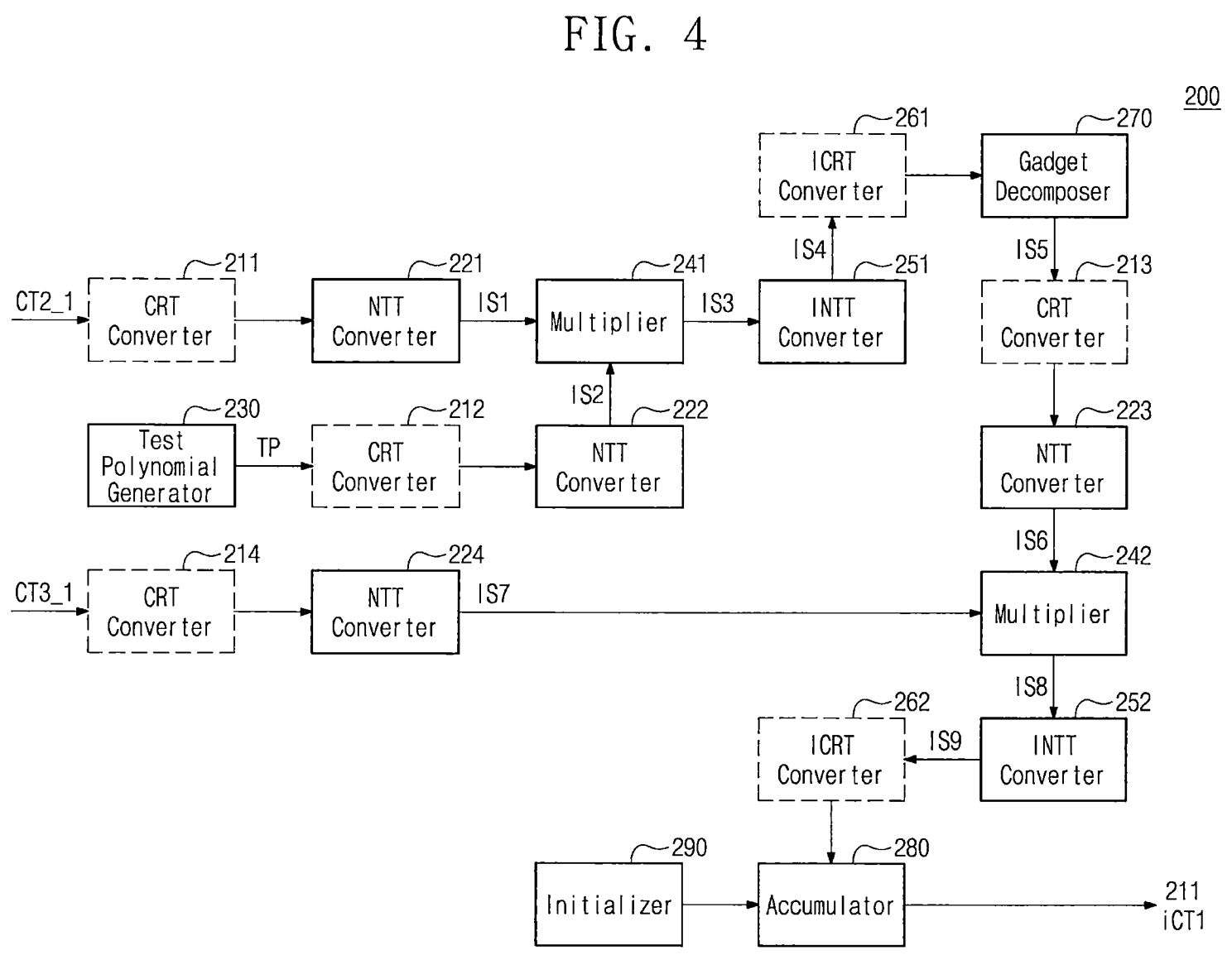

FIG. 4 illustrates an example of a blind rotate module 200 according to an embodiment of the present disclosure. Illustratively, the blind rotate module 200 may correspond to the blind rotate module 141 of FIG. 3.

Referring to FIGS. 1, 2, 3, and 4, the blind rotate module 200 may include first to fourth Chinese Remainder Theorem (CRT) converters 211 to 214, first to fourth NTT (Number Theoretic transform) converters 221 to 224, a test polynomial generator 230, first and second multipliers 241 and 242, first and second INTT (Inverse NTT) converters 251 and 252, first and second ICRT (Inverse CRT) converters 261 and 262, a gadget decomposer 270, an accumulator 280, and an initializer 290.

The first CRT converter 211 may receive the first ciphertext CT2_1 of the second type from an external device, for example, the processor 110. The first ciphertext CT2_1 of the second type may be a TRLWE ciphertext. The TRLWE ciphertext may include a pair of polynomials. The first CRT converter 211 may divide the value of a relatively large coefficient in each polynomial and may convert it into a form capable of division operation. The first CRT converter 211 may transfer the converted result to the first NTT converter 221.

The first NTT converter 221 may perform the NTT operation on an output of the first CRT converter 211. The first NTT converter 221 may output a result of the NTT operation as a first internal signal IS1.

The test polynomial generator 230 may generate a test polynomial TP. The test polynomial TP may be set during manufacture of the blind rotate module 200 or may be set by the processor 110 after the blind rotate module 200 is manufactured.

The second CRT converter 212 may perform CRT conversion on the test polynomial TP. The second CRT converter 212 may output a CRT conversion result to the second NTT converter 222.

The second NTT converter 222 may perform the NTT operation on an output of the second CRT converter 212. The second NTT converter 222 may output a result of the NTT operation as a second internal signal IS2.

The first multiplier 241 may receive the first internal signal IS1 from the first NTT converter 221 and may receive the second internal signal IS2 from the second NTT converter 222. The first multiplier 241 may perform multiplication of the first internal signal IS1 and the second internal signal IS2. The first multiplier 241 may output the multiplication result as a third internal signal IS3.

The first INTT converter 251 may receive the third internal signal IS3 from the first multiplier 241. The first INTT converter 251 may perform INTT operation on the third internal signal IS3. The first INTT converter 251 may output a result of the INTT operation as a fourth internal signal IS4.

The first ICRT converter 261 may receive the fourth internal signal IS4 from the first INTT converter 251. The first ICRT converter 261 may perform an ICRT conversion on the fourth internal signal IS4. The first ICRT converter 261 may transfer the converted result to the gadget decomposer 270.

Illustratively, to perform gadget decomposition in the gadget decomposer 270, the first INTT converter 251 and the first ICRT converter 261 inversely convert the third internal signal IS3 to restore original form.

The gadget decomposer 270 may perform gadget decomposition on the output (restored to the original TRLWE form) of the first ICRT converter 261. The gadget decomposer 270 may decompose a pair of polynomials into a larger number of polynomials. For example, the gadget decomposer 270 may decompose the output of the first ICRT converter 261 to have a form that can be multiplied (or an external product) with the first ciphertext CT3_1 of the third type. The gadget decomposer 270 may output a result of gadget decomposition as a fifth internal signal IS5.

FIG. 5 illustrates an example of the first ciphertext CT3_1 of the third type. Referring to FIG. 5, for example, the first ciphertext CT3_1 of the third type may include a pair of polynomial sets, one polynomial set may include 6 polynomials $A_0(x)$, $A_1(x)$, $A_2(x)$, $A_3(x)$, $A_4(x)$, and $A_5(x)$, and another polynomial set may include six polynomials $B_0(x)$, $B_1(x)$, $B_2(x)$, $B_3(x)$, $B_4(x)$, and $B_5(x)$. Since the output of the first ICRT converter 261 includes a pair of polynomials (e.g., $A(x)$, $B(x)$), the output of the first ICRT converter 261 may have a form in which multiplication (or the external product) with the first ciphertext CT3_1 of the third type is impossible.

For example, it is described that each of the pair of polynomial sets of the first ciphertext CT3_1 of the third type includes 6 polynomials, but this is merely an example. As described above, the first ciphertext CT3_1 of the third type may include $2m*2$ ('m' is a positive integer) polynomials.

FIG. 6 illustrates an example of the fifth internal signal IS5. Referring to FIG. 6, the pair of polynomials $A(x)$ and $B(x)$ may be decomposed into six polynomials $a_0(x)$, $a_1(x)$, $a_2(x)$, $b_0(x)$, $b_1(x)$, and $b_2(x)$.

FIG. 7 illustrates an example in which the fifth internal signal IS5 is multiplied by the first ciphertext CT3_1 of the third type. Referring to FIG. 7, six polynomials $a_0(x)$, $a_1(x)$, $a_2(x)$, $b_0(x)$, $b_1(x)$, and $b_2(x)$ of the fifth internal signal IS5 may be multiplied by the six polynomials $A_0(x)$, $A_1(x)$, $A_2(x)$, $A_3(x)$, $A_4(x)$, and $A_5(x)$ of one polynomial set of the first ciphertext CT3_1 of the third type and the six polynomials $B_0(x)$, $B_1(x)$, $B_2(x)$, $B_3(x)$, $B_4(x)$, and $B_5(x)$ of another polynomial set.

Referring back to FIG. 4, to reduce the operation amount of multiplication (or the external product), the third CRT converter 213 may perform CRT conversion on the fifth internal signal IS5, and the third NTT converter 223 may generate a sixth internal signal IS6 by performing NTT operation on the output of the third CRT converter 213.

In addition, to reduce the operation amount of multiplication (or the external product), the fourth CRT converter 214 may perform the CRT conversion on the first ciphertext CT3_1 of the third type, and the fourth NTT converter 224 may generate a seventh internal signal IS7 by performing the NTT operation on the output of the fourth CRT converter 214.

The second multiplier 242 may receive the sixth internal signal IS6 from the third NTT converter 223 and may receive the seventh internal signal IS7 from the fourth NTT converter 224. The second multiplier 242 may perform multiplication (or the external product) of the sixth internal signal IS6 and the seventh internal signal IS7. The second multiplier 242 may output the multiplication (or the external product) result as an eighth internal signal IS8.

FIG. 8 illustrates an example in which the sixth internal signal IS6 and the seventh internal signal IS7 are multiplied. Illustratively, compared with FIG. 7, in FIG. 8, the effects of the CRT conversion and the NTT operation are omitted and illustrated. Referring to FIG. 8, six polynomials $a_0(x)$, $a_1(x)$, $a_2(x)$, $b_0(x)$, $b_1(x)$, and $b_2(x)$ of the sixth internal signal IS6 may be multiplied by the six polynomials $A_0(x)$, $A_1(x)$, $A_2(x)$, $A_3(x)$, $A_4(x)$, and $A_5(x)$ of one polynomial set of the seventh internal signal IS7 and the six polynomials $B_0(x)$, $B_1(x)$, $B_2(x)$, $B_3(x)$, $B_4(x)$, and $B_5(x)$ of another polynomial set.

An eighth internal signal IS8, which is a result of multiplication (or the external product) of the sixth internal signal IS6 and the seventh internal signal IS7, may include a pair of polynomials $A_{new}(x)$, $B_{new}(x)$. That is, the form of the eighth internal signal IS8 may be a form of the TRLWE ciphertext.

Referring back to FIG. 4, the second INTT converter 252 may receive the eighth internal signal IS8 from the second multiplier 242. The second INTT converter 252 may perform the INTT operation on the eighth internal signal IS8. The second INTT converter 252 may output a result of the INTT operation as a ninth internal signal IS9.

The second ICRT converter 262 may receive the ninth internal signal IS9 from the second INTT converter 252. The second ICRT converter 262 may perform the ICRT conversion on the ninth internal signal IS9. The second ICRT converter 262 may transfer the result of the ICRT conversion to the accumulator 280.

Illustratively, the blind rotate module 200 may operate repeatedly a preset number of times. For example, the blind rotate module 200 may perform loops as many times as set by the processor 110. The above description may correspond to a first loop.

In the first loop, the initializer 290 may initialize the values stored in the accumulator 280. After the values stored in the accumulator 280 are initialized, the accumulator 280 may store a pair of polynomials transferred from the second ICRT converter 262.

In a second loop, the accumulator 280 may transfer the stored pair of polynomials to the first CRT converter 211. Unlike the first loop, the first CRT converter 211 may perform the CRT conversion on the pair of polynomials output from the accumulator 280 instead of the first ciphertext CT2_1 of the second type.

In the second loop, the second to fourth CRT converters 211 to 214, the first to fourth NTT converters 221 to 224, the test polynomial generator 230, the first and second multipliers 241 and 242, the first and second INTT converters 251 and 252, the first and second ICRT converters 261 and 262, and the gadget decomposer 270 may operate in the same way as the first loop. The accumulator 280 may accumulate and store the pair of polynomials output from the second ICRT converter 262 with the previously stored pair of polynomials. When these loops are performed up to the maximum loop, the accumulator 280 may output the stored pair of polynomials as the first internal ciphertext iCT1.

For example, the first to fourth CRT converters 211 to 214 and the first and second ICRT converters 261 and 262 may be selectively provided. When the first and second CRT converters 211 and 212 are not provided, the first ICRT converter 261 may also not be provided. In contrast, when the first and second CRT converters 211 and 212 are provided, the first ICRT converter 261 may also be provided. When the third and fourth CRT converters 213 and 214 are not provided, the second ICRT converter 262 may also not be provided. In contrast, when the third and fourth CRT converters 213 and 214 are provided, the second ICRT converter 262 may also be provided.

Figure 9:
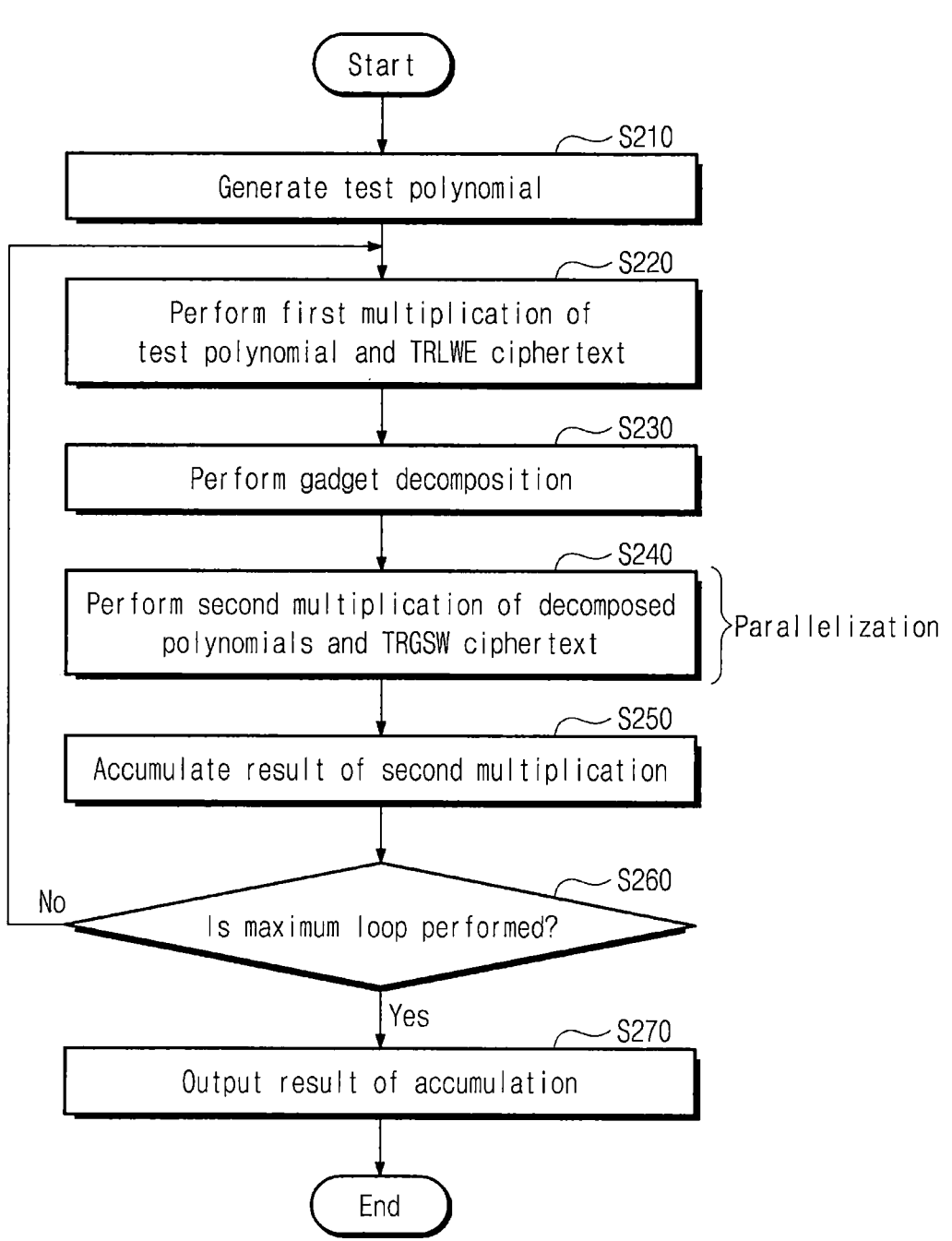
FIG. 9 illustrates an example of an operating method of a blind rotate module, according to an embodiment of the present disclosure.

FIG. 9 illustrates an example of an operating method of the blind rotate module 200, according to an embodiment of the present disclosure. Referring to FIGS. 4 and 9, in operation S210, the blind rotate module 200 may generate a test polynomial. For example, the test polynomial generator 230 may generate the test polynomial TP.

In operation S220, the blind rotate module 200 may perform a first multiplication of the test polynomial and the TRLWE ciphertext. For example, the first multiplier 241 may perform the first multiplication of the test polynomial TP by the first ciphertext CT2_1 of the second type, which is the TRLWE ciphertext. To reduce the amount of operation of the first multiplication, at least one of the CRT conversion (and the inverse CRT conversion) and the NTT operation (and the inverse NTT operation) may be performed on the test polynomial TP and the first ciphertext CT2_1 of the second type.

In operation S230, the blind rotate module 200 may perform the gadget decomposition. For example, the gadget decomposer 270 may perform gadget decomposition on a pair of polynomials, which is a result of the first multiplication to have a form that can be multiplied with the TRGSW ciphertext.

In operation S240, the blind rotate module 200 may perform a second multiplication of the decomposed polynomials by the TRGSW ciphertext. For example, the second multiplier 242 may perform the second multiplication (or the external product) of the decomposed polynomials by the first ciphertext CT3_1 of the third type, which is the TRGSW ciphertext. The result of the second multiplication (or the external product) may be a pair of polynomials in the form of the TRLWE ciphertext. To reduce the operation amount of the second multiplication, at least one of the CRT conversion (and the inverse CRT conversion) and the NTT operation (and the inverse NTT operation) may be performed on the decomposed polynomials and the first ciphertext CT3_1 of the third type.

In operation S250, the blind rotate module 200 may accumulate a result of the second multiplication. For example, accumulator 280 may accumulate the result of the second multiplication.

In operation S260, the blind rotate module 200 may determine whether the maximum loop is performed. When the maximum loop is not performed, the blind rotate module 200 may perform operation S220 again using a pair of polynomials stored in the accumulator 280. Thereafter, the blind rotate module 200 may perform operations S230 to S260 again.

When the maximum loop is performed, in operation S270, the blind rotate module 200 may output the result of the accumulation as the first internal ciphertext iCT1.

Illustratively, the time (or amount of operation) required to perform the second multiplication in operation S240 may be about 20 times the time (or amount of operation) required to perform the first multiplication in operation S220, and may be about 20 times the time (or amount of operation) required to perform the accumulation in operation S250. Therefore, by parallelizing the process of performing the second multiplication in operation S240, the operating time of the blind rotate module 200 may be reduced.

FIG. 10 illustrates an example of a blind rotate module 300 that performs a second multiplication in parallel. Referring to FIGS. 1 and 10, the blind rotate module 300 may include first to fourth Chinese Remainder Theorem (CRT) converters 311 to 314, first to fourth NTT (Number Theoretic transform) converters 321 to 324, a test polynomial generator 330, first and second multipliers 341 and 342, first and second INTT (Inverse NTT) converters 351 and 352, first and second ICRT (Inverse CRT) converters 361 and 362, a gadget decomposer 370, an accumulator 380, and an initializer 390.

The first and second CRT converters 311 and 312, the first and second NTT converters 321 and 322, the test polynomial generator 330, the first multiplier 341, the first and second INTT converters 351 and 352, the first and second ICRT converters 361 and 362, the gadget decomposer 370, the accumulator 380, and the initializer 390 may have the same configuration as the first and second NTT converters 221 and 222, the test polynomial generator 230, the first multiplier 241, the first and second INTT converters 251 and 252, the first and second ICRT converters 261 and 262, the gadget decomposer 270, the accumulator 280, and the initializer 290 as described with reference to FIG. 4, and may operate in the same way as them. Thus, additional description will be omitted to avoid redundancy.

The third CRT converter 313 may include a plurality of CRT conversion modules. The plurality of CRT conversion modules may respectively perform CRT conversions on a plurality of polynomials of the fifth internal signal IS5. By parallelizing CRT conversions of a plurality of polynomials of the fifth internal signal IS5 using the plurality of CRT conversion modules, the CRT conversion speed of the third CRT converter 313 may be improved.

The third NTT converter 323 may include a plurality of NTT modules. The plurality of NTT modules may respectively perform NTT operations on a plurality of polynomials output from the third CRT converter 313. By parallelizing NTT operations of the plurality of polynomials using the plurality of NTT modules, the NTT operation speed of the third NTT converter 323 may be improved.

The fourth CRT converter 314 may include a plurality of CRT conversion modules. The plurality of CRT conversion modules may respectively perform CRT conversions on a plurality of polynomials of the first ciphertext CT3_1 of the third type. The CRT conversion speed of the fourth CRT converter 314 may be improved by parallelizing CRT conversions of the plurality of polynomials of first ciphertext CT3_1 of the third type using the plurality of CRT conversion modules.

The fourth NTT converter 324 may include a plurality of NTT modules. The plurality of NTT modules may respectively perform NTT operations on a plurality of polynomials output from the fourth CRT converter 314. By parallelizing NTT operations of the plurality of polynomials using the plurality of NTT modules, the NTT operation speed of the fourth NTT converter 324 may be improved.

The second multiplier 342 may include a plurality of multiplication modules. The plurality of multiplication modules may respectively perform multiplications of the plurality of polynomials of the sixth internal signal IS6 and the plurality of polynomials of the seventh internal signal IS7. By parallelizing multiplications of the plurality of polynomials and the plurality of polynomials of the seventh internal signal IS7 using the plurality of multiplication modules, the speed at which the second multiplier 342 performs multiplication (or the external product) may be improved.

As described above, the blind rotate module 300 according to an embodiment of the present disclosure may reduce the time required for the operation of the blind rotate module 300 and may reduce the time required for bootstrapping, by parallelizing the second multiplication that requires the longest time.

Figure 11:
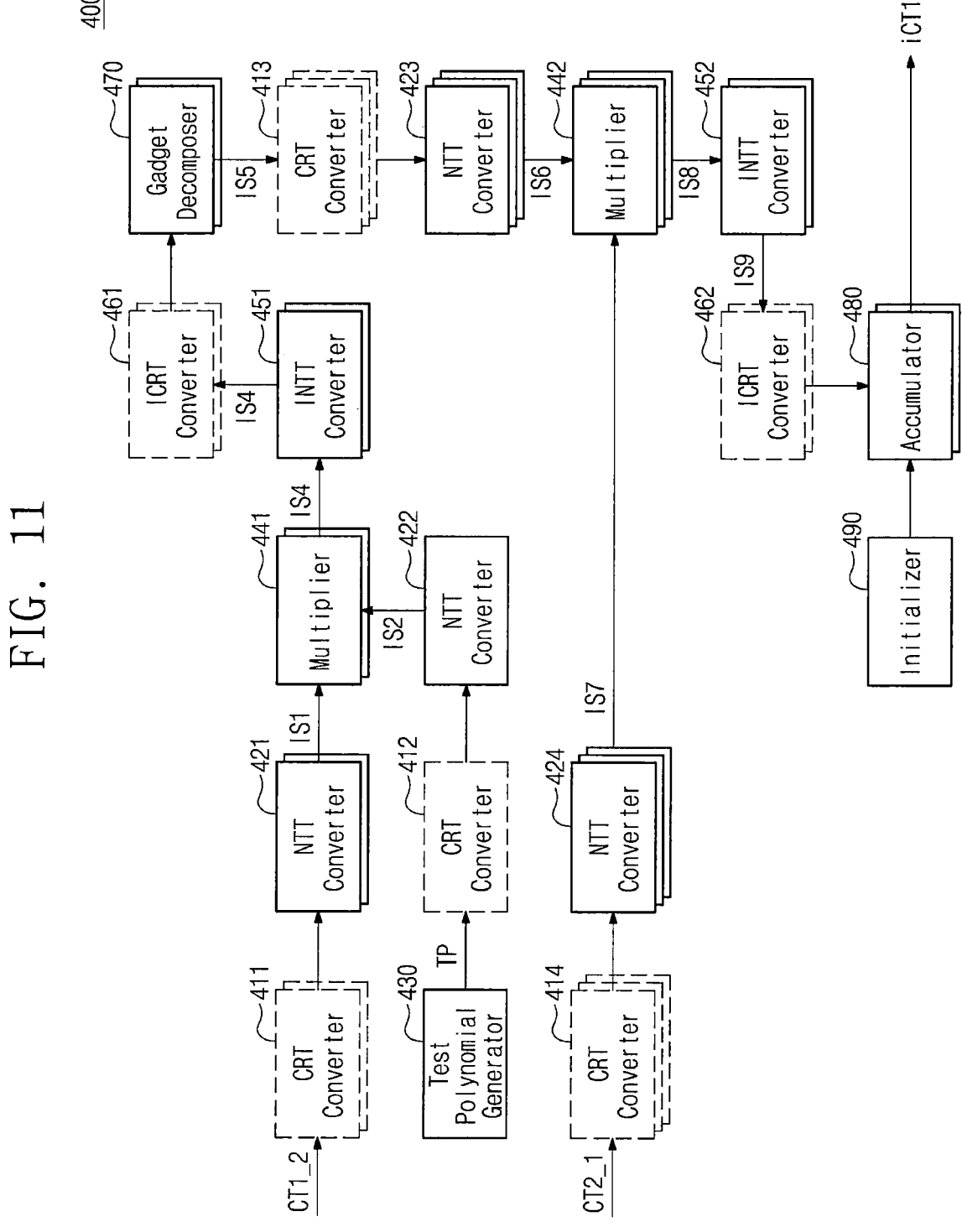
FIG. 11 illustrates an example of a blind rotate module that performs additional parallelization.

FIG. 11 illustrates an example of a blind rotate module 400 that performs additional parallelization. Referring to FIGS. 1 and 11, the blind rotate module 400 may include first to fourth CRT converters 411 to 414, first to fourth NTT converters 421 to 424, a test polynomial generator 430, first and second multipliers 441 and 442, first and second INTT converters 451 and 452, first and second ICRT converters 461 and 462, a gadget decomposer 470, an accumulator 480, and an initializer 490.

The third and fourth CRT converters 413 and 414, the third and fourth NTT converters 423 and 424, the test polynomial generator 430, the second multiplier 442, and the initializer 490 may have the same configuration as the third and fourth CRT converters 313 and 314, the third and fourth NTT converters 323 and 324, the test polynomial generator 330, the second multiplier 342, and initialization as described with reference to FIG. 10, and may operate in the same way as them. Thus, additional description will be omitted to avoid redundancy.

The first CRT converter 411 may include a pair of CRT conversion modules. The pair of CRT conversion modules may respectively perform CRT conversions on a pair of polynomials of the first ciphertext CT2_1 of the second type. The CRT conversion speed of the first CRT converter 411 may be improved by parallelizing CRT conversions of the pair of polynomials of the first ciphertext CT2_1 of the second type using the pair of CRT conversion modules.

The first NTT converter 421 may include a pair of NTT modules. The pair of NTT modules may respectively perform NTT operations on a pair of polynomials output from the first CRT converter 411. By parallelizing NTT operations of a pair of polynomials using the pair of NTT modules, the NTT operation speed of the first NTT converter 421 may be improved.

The first multiplier 441 may include a pair of multiplication modules. The pair of multiplication modules may respectively perform multiplications of a pair of polynomials of the first internal signal IS1 and a polynomial of the second internal signal IS2. The multiplication speed of the first multiplier 441 may be improved by parallelizing multiplications of the pair of polynomials of the first internal signal IS1 and the polynomial of the second internal signal IS2 using the pair of multiplication modules.

The first INTT converter 451 may include a pair of INTT modules. The pair of INTT modules may respectively perform INTT operations on a pair of polynomials of the third internal signal IS3. By parallelizing INTT operations of the pair of polynomials using the pair of INTT modules, the INTT operation speed of the first INTT converter 451 may be improved.

The first ICRT converter 461 may include a pair of ICRT conversion modules. The pair of ICRT conversion modules may respectively perform ICRT conversions on a pair of polynomials of the fourth internal signal IS4. By parallelizing ICRT conversions of the pair of polynomials using the pair of ICRT conversion modules, the ICRT conversion speed of the first ICRT converter 461 may be improved.

The second INTT converter 452 may include a pair of INTT modules. The pair of INTT modules may respectively perform INTT operations on a pair of polynomials of the eighth internal signal IS8. By parallelizing INTT operations of the pair of polynomials using the pair of INTT modules, the INTT operation speed of the first INTT converter 452 may be improved.

The second ICRT converter 462 may include a pair of ICRT conversion modules. The pair of ICRT conversion modules may respectively perform ICRT conversions on a pair of polynomials of the ninth internal signal IS9. By parallelizing ICRT conversions of the pair of polynomials using the pair of ICRT conversion modules, the ICRT conversion speed of the second ICRT converter 462 may be improved.

The accumulator 480 may include a pair of accumulation modules. The pair of accumulation modules may respectively perform accumulations of the pair of polynomials output from the second ICRT converter 262. By parallelizing the accumulations of the pair of polynomials using the pair of accumulation modules, the multiplication speed of the accumulator 480 may be improved.

In FIG. 11, all components associated with two or more polynomials are described as being parallelized. However, among components associated with two or more polynomials, some components requiring relatively little operation time (or amount of operation) may not be implemented in parallel. Hardware resources may be saved by not implementing some components that require relatively little operation time (or amount of operation) in parallel.

Figure 12:
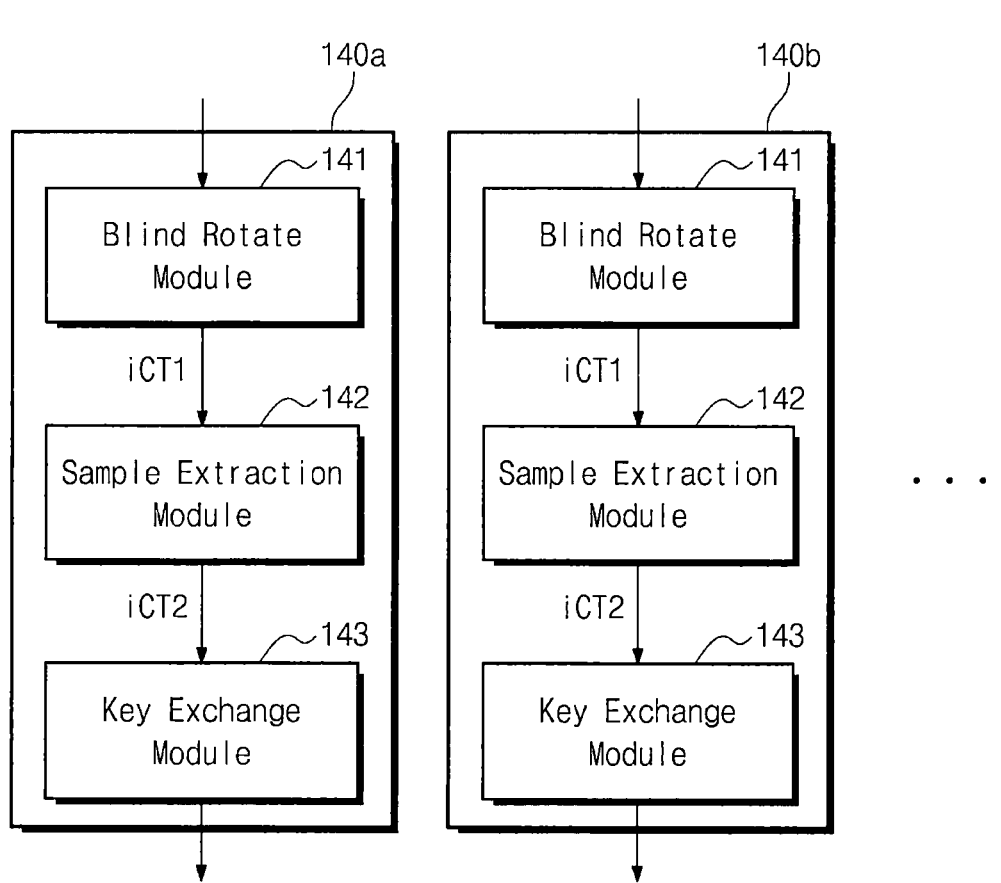
FIG. 12 illustrates a second accelerator, according to another embodiment of the present disclosure.

FIG. 12 illustrates a second accelerator 140' according to another embodiment of the present disclosure. Referring to FIG. 12, the second accelerator 140' may include two or more accelerators including an a-th accelerator 140a and a b-th accelerator 140b. Each of the two or more accelerators may include the blind rotate module 141, the sample extraction module 142, and the key exchange module 143. Each of the two or more accelerators may be configured identically to, and may operate identically to, the second accelerator 140 described with reference to FIG. 3.

The two or more accelerators may perform bootstrapping of ciphertexts independent of each other in parallel. In detail, the second accelerator 140' may be configured to simultaneously perform bootstrapping of two or more TRLWE ciphertexts and to output two or more TLWE ciphertexts.

In the above embodiments, components according to the present disclosure are described by using the terms "first", "second", "third", and the like. However, the terms "first", "second", "third", and the like may be used to distinguish components from each other and do not limit the present disclosure. For example, the terms "first", "second", "third", and the like do not involve an order or a numerical meaning of any form.

In the above embodiments, components according to embodiments of the present disclosure are described by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. In addition, the blocks may include circuits composed of semiconductor devices in the IC or circuits registered as an IP (Intellectual Property).

According to an embodiment of the present disclosure, the bootstrapping of the FHE may be performed by a hardware accelerator, and at least part of the bootstrapping may be performed by independent modules in parallel. Accordingly, an accelerator device and an operating method of the accelerator device capable of improving a speed of the bootstrapping are provided.

The above descriptions are specific embodiments for carrying out the present disclosure. Embodiments in which a design is changed simply or which are easily changed may be included in the present disclosure as well as an embodiment described above. In addition, technologies that are easily changed and implemented by using the above embodiments may be included in the present disclosure. Therefore, the scope of the present disclosure should not be limited to the above-described embodiments and should be defined by those equivalent to the claims of the disclosure as well as the claims to be described later.

What is claimed is:

1. A computing device comprising:
  memory;
  a processor configure to execute code stored in the memory to:
  perform a Number Theoretic Transform (NTT) operation on a first ciphertext of a first type received from an external device to generate a first internal signal;
  generate a test polynomial;
  perform the NTT operation on the test polynomial to generate a second internal signal;
  perform multiplication on the first internal signal and the second internal signal to generate a third internal signal;
  perform an inverse NTT (INTT) operation on the third internal signal to generate a fourth internal signal;
  perform a gadget decomposition on the fourth internal signal to generate a fifth internal signal;
  perform the NTT operation on the fifth internal signal to generate a sixth internal signal;
  perform the NTT operation on a first ciphertext of a second type received from the external device to generate a seventh internal signal;
  perform multiplication on the sixth internal signal and the seventh internal signal to generate an eighth internal signal;
  perform the INTT operation on the eighth internal signal to generate a ninth internal signal; and
  accumulate the ninth internal signal to generate a second ciphertext of the first type.

2. The accelerator device of claim 1, wherein the first type includes a TRLWE (Torus Ring Learning With Error).

3. The accelerator device of claim 1, wherein the second type includes a TRGSW (Torus Ring Gentry, Sahai, Waters).

4. The accelerator device of claim 1, wherein the fifth internal signal includes a plurality of polynomials, and a plurality of NTT modules perform the NTT operation for each of the plurality of polynomials.

5. The accelerator device of claim 1, wherein the first ciphertext of the second type includes a plurality of polynomials, and a plurality of NTT modules perform the NTT operation for each of the plurality of polynomials.

6. The accelerator device of claim 1, wherein the sixth internal signal includes a plurality of first polynomials, wherein the seventh internal signal includes a plurality of second polynomials, and wherein a plurality of multiplication modules perform multiplications of the plurality of first polynomials and the plurality of second polynomials in parallel.

7. The accelerator device of claim 6, wherein at least one addition module adds outputs of the plurality of multiplication modules.

8. The accelerator device of claim 1, wherein the processor is further configured to perform a first Chinese Remainder Theorem (CRT) conversion on the first ciphertext of the first type and to perform the NTT operation on a result of the first CRT conversion.

9. The accelerator device of claim 8, wherein the processor is further configured to perform a second Chinese Remainder Theorem (CRT) conversion on the test polynomial and to perform the NTT operation on transfer a result of the second CRT conversion.

10. The accelerator device of claim 9, wherein the processor is further configured to perform an inverse CRT (ICRT) conversion on the fourth internal signal and to perform the gadget decomposition on a result of the ICRT conversion.

11. The accelerator device of claim 1, wherein the processor is further configured to perform a first Chinese Remainder Theorem (CRT) conversion on the fifth internal signal and to perform the NTT operation on a result of the first CRT conversion.

12. The accelerator device of claim 11, wherein the processor is further configured to perform a second CRT conversion on the first ciphertext of the second type and to perform the NTT operation on a result of the second CRT conversion.

13. The accelerator device of claim 12, wherein the processor is further configured to perform an inverse CRT (ICRT) conversion on the ninth internal signal and to perform the accumulation on a result of the ICRT conversion.

14. A method of operation of an accelerator device, the method comprising:

generating, by the accelerator device, a test polynomial;

performing, by the accelerator device, a first multiplication on the test polynomial and a first ciphertext of a first type received from an external device;

performing, by the accelerator device, gadget decomposition on a result of the first multiplication;

performing, by the accelerator device, a second multiplication on polynomials decomposed by the gadget decomposition and a first ciphertext of a second type received from the external device; and accumulating, by the accelerator device, a result of the second multiplication; and performing, by the accelerator device, first NTT operations in parallel on polynomials decomposed by the gadget decomposition using a plurality of first number theoretic transform (NTT) modules;

wherein the accelerator device is configured to perform the second multiplication in parallel using a plurality of multiplication modules.

15. The method of claim 14, further comprising performing, by the accelerator device, second NTT operations in parallel on the first ciphertext of the second type using a plurality of second NTT modules.

16. The method of claim 15, further comprising performing, by the accelerator device, an inverse NTT (INTT) operation on the result of the second multiplication using an inverse NTT converter.

17. A method of operation of an accelerator device, the method comprising:

generating, by the accelerator device, a test polynomial;

performing, by the accelerator device, a first multiplication on the test polynomial and a first ciphertext of a first type received from an external device;

performing, by the accelerator device, gadget decomposition on a result of the first multiplication;

performing, by the accelerator device, a second multiplication on polynomials decomposed by the gadget decomposition and a first ciphertext of a second type received from the external device; and accumulating, by the accelerator device, a result of the second multiplication, and performing, by the accelerator device, first CRT conversions in parallel on polynomials decomposed by the gadget decomposition using a plurality of first Chinese Remainder Theorem (CRT) conversion modules;

wherein the accelerator device is configured to perform the second multiplication in parallel using a plurality of multiplication modules.

18. The method of claim 17, further comprising performing, by the accelerator device, second CRT conversions in parallel on the first ciphertext of the second type using a plurality of second CRT conversion modules.

19. The method of claim 18, further comprising performing, by the accelerator device, an inverse CRT (ICRT) conversion on the result of the second multiplication using an inverse CRT (ICRT) converter.

*     *     *     *     *